G. BURTON.
APPARATUS FOR PRODUCING AND CONDENSING DISTILLATE.
APPLICATION FILED SEPT. 22, 1915.
1,238,256.  Patented Aug. 28, 1917.
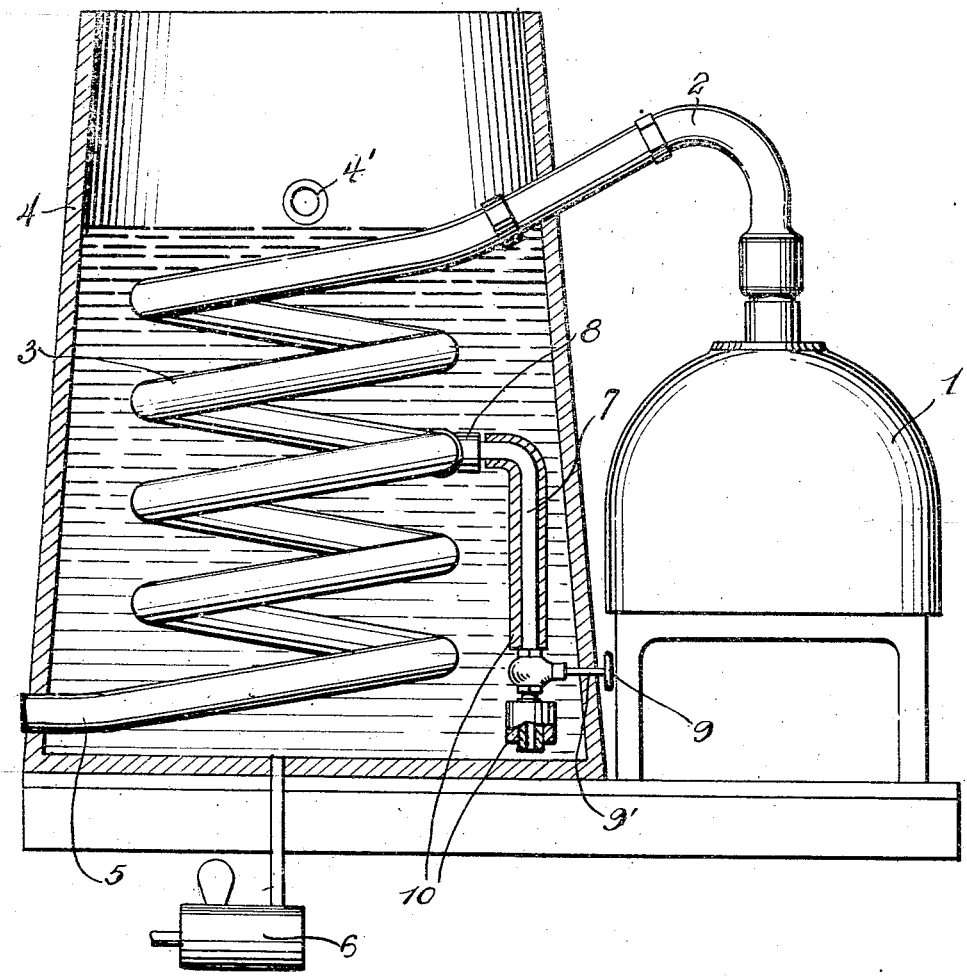

UNITED STATES PATENT OFFICE.

GRANT BURTON, OF STAPLETON, ALABAMA.

APPARATUS FOR PRODUCING AND CONDENSING DISTILLATE.

1,238,256.   Specification of Letters Patent.   Patented Aug. 28, 1917.

Application filed September 22, 1915. Serial No. 52,101.

*To all whom it may concern:*

Be it known that I, GRANT BURTON, a citizen of the United States, residing at Stapleton, in the county of Baldwin and State of Alabama, have invented certain new and useful Improvements in Apparatus for Producing and Condensing Distillate, of which the following is a specification.

My invention relates to a process for economically condensing distillate, especially that from roasted wood and particularly that containing turpentine.

One principal object of the invention is to provide a process to cool distillates especially turpentine so that it will have been thoroughly condensed when it passes from the condensing worm to the collecting receptacle to secure greater economy in its production. According to the present processes, although the said worm is usually disposed in a cooling medium like water to aid in condensing the volatile turpentine leaving the still, yet the turpentine is in a heated condition and not condensed, to such a degree as to avoid loss due to volatilization when the turpentine contacts with the atmosphere in passing from the worm to the collecting receptacle. It is this loss which I particularly aim to avoid.

By virtue of the process, water or another suitable medium of less temperature than the turpentine passing from the still, is admitted to the still so as to act on the turpentine in order to cool the same and complete its condensation to the end that the turpentine when it contacts with the atmosphere is completely in a liquid state of a temperature below its point of volatilization.

Another object of the invention is to utilize a quantity of the water supply to the tank within which the usual worm is disposed as the liquid which passes into the worm for the purpose previously mentioned.

With the above and additional objects such as will hereinafter appear, in view, the invention is hereinafter described with respect to one form of apparatus which is illustrated in the accompanying drawing, wherein:—

The view shown is an elevation, partly in vertical section.

Referring specifically to the drawings, 1 designates the still in which the wood or logs from coniferous trees are roasted in the usual way to distil the same. Connecting with the still is an elbow pipe section 2 which in turn connects with a condensing pipe in the form of a worm 3. Worm 3 is disposed within a tank or receptacle 4 and positioned therein since pipe 2 passes through the wall of the tank and the lower extremity of the worm which is designated 5 also passes through said wall but at a substantially diametrically opposite point to the pipe 2. Tank 4 preferably contains a supply of water or other liquid medium, as indicated in the usual way, in order to refrigerate the worm 3 to condense the distillate passing therethrough. Water may be supplied from a suitable source to the tank 4 under pressure as through the medium of a pump 6, and may discharge through a pipe 4'.

The apparatus described is indicative of the construction usually employed and as is well known the distillate containing volatile turpentine passes from still 1 through elbow pipe 2, worm 3 and pipe 5 to a collecting receptacle. However as is also well known, the distillate as it leaves pipe 5 is in a heated state due to which fact upon its contact with the atmosphere a valuable portion of the turpentine is accordingly lost.

To avoid the loss of turpentine in the manner just mentioned, the parts now to be described have been provided. One of the coils of worm 3 has a pipe 7 connected to it by means of a coupling 8. This pipe 7 is open at its lowest extremity in order to communicate with the interior of the tank. The stem of valve 9 is designated 9' and preferably extends through the wall of tank 4 to increase the effective support of pipe 7. Since the liquid within tank 4 is heated to some extent, I surround the sections of pipe 7 with tubes or jackets 10 of any suitable material to prevent transmission of heat from the fluid within the pipe to the fluid surrounding the same, or vice versa.

According to my improved process, as the distillate passes through worm 3, a quantity of the water pumped into tank 4 through the medium of the pump 6, or another suitable cooling medium of lower temperature than the distillate passing through the coil, is supplied to worm 3 in a suitable quantity, determined by the position of valve 9. Since the water is supplied to tank 4 under pressure, induced by the head of water in the tank 4, said head being limited by the provision of an overflow opening 4', a quantity will readily rise through pipe 7 into the coil. Since the water in tank 4 increases in temperature in proportion to its height, the intake end of pipe 7 is preferably disposed adjacent to the bottom of the tank where the water is cool enough to condense the distillate upon its introduction in worm 3. The water or other medium from pipe 7 mixes with the distillate in worm 3 and effectively cools the same to a temperature below its point of volatilization so that when it emerges from the pipe 6 it will be completely in a liquid state and free from volatilization and therefore the usual loss due to volatilization will not occur. It will be realized that the condensed distillate is lighter than the water; therefore after the mixture has settled in the receiving vessel (not shown), such condensed distillate will rise above the water in the collecting receptacle whence it can be readily removed.

Since merely the essential features have been illustrated and described, it is to be understood that changes in the details of the apparatus and process may be resorted to within the spirit and scope of the invention as defined by appended claims.

I claim:—

1. In a distilling apparatus, a still, a vapor container in communication with said still, a receptacle containing a liquid in which said vapor container is disposed, and a condensing agent supply pipe connected to said vapor container and passing through said liquid to supply a portion of said liquid to the vapor container, and heat insulating material surrounding said pipe.

2. In distilling apparatus, a still, a vapor container in communication therewith, a condensing agent supply pipe connected to said vapor container, a tank to contain a cooling medium within which said vapor container is disposed, whereby, a portion of said cooling medium may enter the condenser through said supply pipe, and a valve in said pipe, said valve having a stem mounted in said tank.

3. A distilling apparatus including a still, a tank to contain a cooling liquid, a vapor container in communication with said still disposed in said liquid and having portions mounted in said tank, a pipe in said tank communicating with the interior of the tank to supply a portion of the cooling liquid to the vapor container, a coupling to connect said pipe to the vapor container, a valve for said pipe having a stem, and means surrounding the pipe disposed in said liquid to insulate the pipe from the heat of said liquid.

In testimony whereof I affix my signature in presence of two witnesses.

GRANT BURTON.

Witnesses:
REBECCA BURTON,
W. F. SIBLEY.

Copies of this patent may be obtained for five cents each, by addressing the "Commissioner of Patents, Washington, D. C."